United States Patent [19]

Carré

[11] 3,896,433
[45] July 22, 1975

[54] PROCESSING DEVICE
[75] Inventor: Roland Carré, Paris, France
[73] Assignee: Thomson-CSF, Paris, France
[22] Filed: Jan. 15, 1974
[21] Appl. No.: 433,455

[30] Foreign Application Priority Data
Jan. 18, 1973   France .............................. 73.01748

[52] U.S. Cl. .................................. 343/5 R; 328/58
[51] Int. Cl. .......................... G01s 9/00; H03k 5/04
[58] Field of Search ....................... 343/5 R; 328/58

[56] References Cited
UNITED STATES PATENTS
| | | | |
|---|---|---|---|
| 2,764,678 | 9/1956 | Craib | 328/58 |
| 2,912,601 | 11/1959 | Slatten, Jr. | 328/58 |
| 2,989,743 | 6/1961 | Varela | 328/58 |
| 3,068,417 | 12/1962 | Fiske | 328/58 |
| 3,247,457 | 4/1966 | Kaenel | 328/58 |

Primary Examiner—Richard A. Farley
Assistant Examiner—T. M. Blum
Attorney, Agent, or Firm—Edwin E. Greigg

[57]  ABSTRACT

A processing device for stretching video signals in a pulse radar system between the output of the receiver of large pass bandwidth and exploiting means such as an oscilloscope. A delay line connected to the output of the receiver provides a plurality of output signals to an non-linear circuit which transmits, to said exploiting means, only the signal having the greatest amplitude and blocks the other signal for preserving the signal to noise ratio.

3 Claims, 4 Drawing Figures

PROCESSING DEVICE

BACKGROUND OF THE INVENTION

The present invention relates to devices for processing video signals in a radar equipment, and more particularly to a radar emitting and receiving short pulses. A radar of this kind has a high resolving power, enabling it to more readily distinguish an echo from an object in space, from other parasitic echos due to the environment (ground echos, sea clutter, cloud clutter). Since it operates using very short pulses, the radar receiver has a substantial video pass band width.

This video signal is thus applied to an exploiting system which may for example be a cathode ray tube, a graph recorder, magnetic recorder or an extractor.

These exploiting systems have to present a pass band width at least equivalent to that of the video signal applied to them. However, although it is relatively simple to produce radars having a high resolving power, it is becoming progressively more difficult to improve the pass band width of the exploiting systems. Attempts to improve these systems give rise to expensive equipment and sometimes lead to insoluble problems.

In fact, in the case of a cathode ray tube, the image produced upon the screen by a pulse, that is to say the light spot produced there, has certain finite dimensions which cannot be reduced beyond a certain limit as the pulse duration reduces. This limitation on the spot dimensions is due, amongst other things, to the diffusion of the light on the screen, to secondary electron emissions at the luminescent surface, and also to the limits governing the visual acuity of the operator. Moreover, as the pulse duration decreases the energy required for the illumination of the spot also decreases in relation to that of the parasitic signals with which the pulse tends to be confused. The situation is as if the light spot were being produced by a pulse of greater duration but lower amplitude, and thus as if the pass band of the system were narrow.

The same applies to the case of recorders. The frequency limitations are due to the mechanical inertia or to the small pass band widths of the magnetic data carries used for recording. In the case of extractors, these limitations are due to the capacities of the storage circuits, to the sampling frequencies or to the computing times.

The advantages achieved by the high resolution of the radar, are virtually cancelled out because of the narrow pass band width of the exploiting system.

SUMMARY OF THE INVENTION

The processing device in accordance with the invention, makes it possible to avoid the above mentioned drawbacks by adapting the duration of the video signal pulses to the pass band width of the exploiting system. It thus retains the benefit of good separation between the useful echos and the parasitic signals by using non-linear circuits for preserving the signal to noise ratio.

In accordance with one feature of the invention, there is provided a device for processing video signals in a pulse radar, between the output of the receiver of determined pass band width and a system for exploiting the signals having a narrower pass band, said device comprising at least one delay line having an input for receiving the video signals from the receiver and a plurality of outputs and a non-linear transmission circuit for transmitting to the exploiting system the only signal, at the outputs of the delay line, which has the greater amplitude and for stoping the other output signals having a lower amplitude.

Using the device in accordance with the invention, the length of a pulse is multiplied by a certain number, and its energy likewise. By its non-linear properties, the energy of the parasitic signals is not increased. Thus, compression of the video frequency band is achieved without the attendant drawbacks, the bandwidth being matched to that of the exploiting system. Thus, the contrast between a useful echo and parasitic echos, is improved.

Of course, the resolving power is reduced accordingly although in the majority of cases this is a minor drawback where the targets being monitored are not very close to one another.

BRIEF DESCRIPTION OF THE DRAWING

Other features of the invention will become apparent from the ensuing description, illustrated by the Figures in which.

DESCRIPTION OF THE PREFERRED EMBODIMENT

An example of the device in accordance with the invention will be given, which relates for example to a system for displaying the video signal of a radar, utilizing a cathode ray tube.

Figure 1:
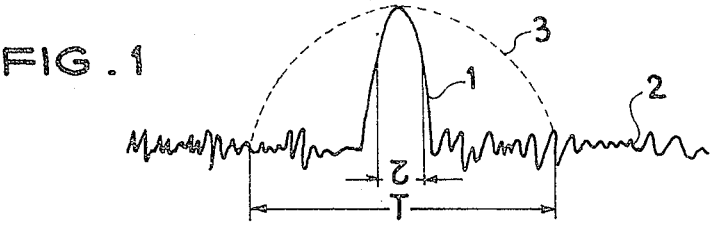
FIG. 1 shows an example of the video signal at the output of the radar.

FIG. 1, as a function of time, illustrates an example of a video signal at the output of the radar receiver. At 1, a pulse of duration $\tau$, being the echo from an object, has been shown, together with parasitic signals 2 at either side of the useful echo 1 which has been assumed to have a higher amplitude.

If this signal is applied as such, to the cathode of the tube, the pulse 1 will produce a light spot on the tube screen. This light spot will have a finite bottom limiting size.

If for example we consider the screen of a storage-type cathode ray tube, on which two light spots 1 centimetre apart represent two objects which are in fact 7.5 kilometres apart, the minimum diameter of a light spot will be in the order of 0.4 millimetre and this corresponds to a range resolution of 150 metres. The same resolution would be obtained from a radar system emitting pulses of duration T equal to 1 microsecond. If there were only one object in the space covered by the radar, this would mean that the object was being illuminated by a 1 microsecond pulse.

If the pulse duration is reduced to only 0.2 microsecond, the dimensions of the light spot will remain in the order of 0.4 millimetres in accordance with what has been said earlier. By contrast, the energy required to illuminate the spot is five times less than if the pulse were to have a duration of 1 microsecond. For the operator to see this spot under proper conditions, he must therefore increase the brilliance of the image overall, by adjusting the gain of an amplifier. In this way, he also increases the energy of the parasitic signals and the contrast of the image is severely affected.

Figure 2:
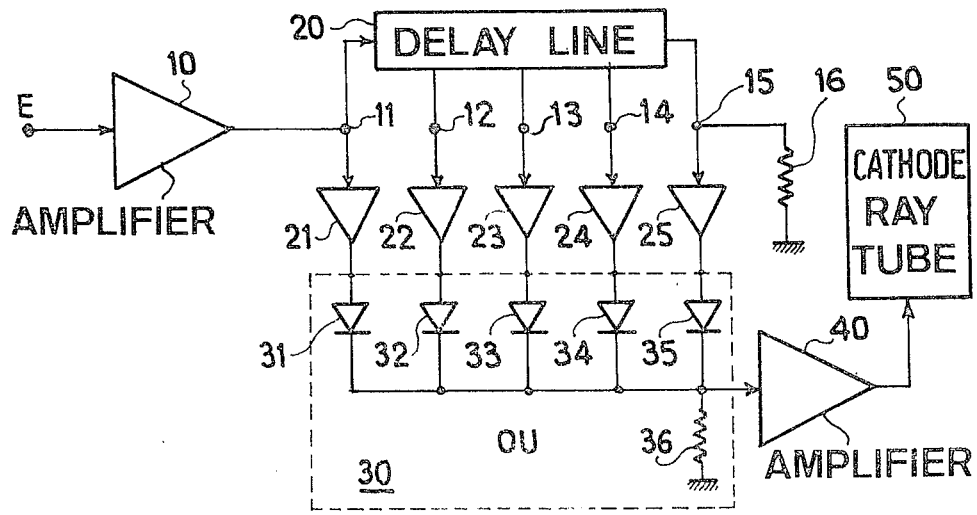
FIG. 2 shows an example of a processing device in accordance with the invention.

The processing device in accordance with the invention compensates for this loss of energy on the part of the useful signal, so that the contrast of the image remain satisfactory. An example of this device is given in FIG. 2.

It comprises an input terminal E receiving the video signal from the radar receiver, that is to say the output signal of the receiver detector stage. The terminal E is connected to the input of an amplifier 10 whose pass band width is equivalent to the pass band B of the receiver. The output of this amplifier is connected to the input 11 of a delay line 20 with four outputs 12, 13, 14 and 15. The input 11 also being used as an output, the line thus comprises a total of 5 output terminals. The delay introduced by the line between each output terminal and the next, has a value $\tau 1$ equal to the reciprocal of the pass band B of the receiver, that is to say substantially to the duration $\tau$ of the pulses. The delay line is terminated in its own surge impedance 16. The terminals 11, 12, 13, 14 and 15 are respectively connected to amplifiers 21, 22, 23, 24, 25 of pass band B, of high input impedance and of low output impedance. Their outputs are respectively connected to five inputs of a non-linear circuit 30. This circuit comprises five diodes 31, 32, 33, 34, 35 whose cathodes are connected to a load resistor 36. The output signal, picked off across the terminals of the resistor 36, is applied to the input of an amplifier 40 whose pass band is substantially equal to one fifth of the bandwidth B, and then to a system 50 for exploiting the signals, comprising a cathode ray tube.

Figure 3:
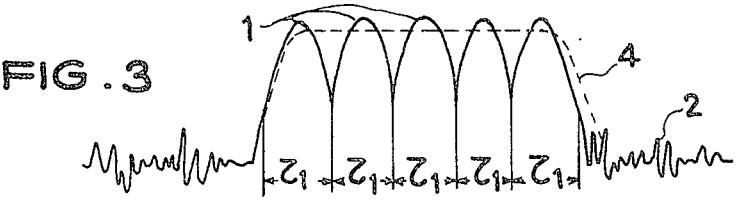
FIG. 3 shows an example of the signal at the input to the processing system.

The operation of the device will be better understood from a consideration of FIG. 3 which illustrates the same signal as that shown in FIG. 1, however, after processing, that is to say in the form which it has when applied to the system 50.

The amplified pulse 1 is applied to the delay line 20. It thus produces five time staggered pulses of duration $\tau 1$ which are separately amplified and applied to the five inputs of the non-linear circuit 30. The pulse 1 is applied only to one input of this circuit at a time. The corresponding diode is then driven conductive and the potential across the terminals of the resistor 36 rises. At the same time, the other inputs of the circuit 30 receive low amplitude signals which are the parasitic signals 2. The four other diodes 22 to 25 are thus blocked and the circuit only transmits the pulse 1. More generally, the circuit 30 only transmits the input signal whose amplitude is highest. The diodes 31, 32, 33, 34, 35 are successively driven conductive and the output of the circuit supplies a series of five pulses of total duration 5 $\tau 1$, equivalent to the duration T corresponding to the spot dimensions. The pass band of the amplifier 40 being narrower than that of the amplifiers 10, 21, 22, 23, 24, 25 it performs a low-pass filtering function and produces a pulse 4 of approximate duration T. The light spot will then have the same size 0.4 mm but the energy produced in order to obtain its brilliance is multiplied by 5 whereas the energy of the parasitic signals remains unchanged.

The signal to noise ratio remains substantially unchanged since the amplitude of the noise and the signal are unchanged. Only the duration of the signal is stretched in a ratio of 5. The non-linear properties of the circuit 30 prevent the amplitude of the noise from being increased by not adding it to the signal.

Self-evidently, the resolving power is lower in the system which exploits the signal, than it is at the radar output, but the ratio between the energies of the useful and the parasitic signals, is not degraded any further.

Figure 4:
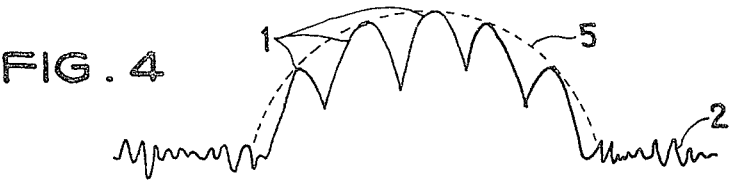
FIG. 4 shows an example of said same signal produced from an improved processing device.

An improvement in the device can be achieved by modyfying the relative gains of the amplifiers 21 to 25. The gains of the amplifiers connected to the ends of the delay line are reduced in relation to the gains of the others, so that the envelope of the output pulses from the circuit 30 has the shape of a Gaussian curve, as shown by the graph 5 in FIG. 4. In other words, the brilliance of a spot decreases towards the edges. Instead of a pulse duration $\tau$, the same spot could be obtained from a wider pulse of duration T but whose envelope has the form of a Gaussion curve. By influencing the relative gains of the amplifiers 21, to 25, it is possible to obtain at the output of the amplifier 40 a pulse having this form. Each gain can be greater or lower than 1.

The processing device which has been described, can be applied equally to any other kind of system of exploiting the signals. In each case, the gains of the amplifiers coupled to the output terminals of the delay line, are determined in such a fashion that the curve representing the gain values as a function of the order of the amplifiers, is similar to the curve representing the pulse response of the system responsible for exploiting the signals. This applies in particular when the ratio B/b is large.

The number of outputs of the delay line 20 is determined by the ratio between the pass band b of the system used to exploit the signals, and that of the receiver B. The energy of a pulse is multiplied by a whole number $m$, where $m$ is virtually equal to the ratio B/b, utilizing a delay line with $m$ output terminals.

The processing device of the invention provides a solution to the problem of matching data rates of signals between two equipments when the frequency characteristics of both equipments are fixed.

What is claimed is:

1. A processing device for processing video signals in a pulse radar system, between an output of the radar's receiver which has a determined pass-band width (B) and an input of exploiting means having a narrower bandwidth ($b$), said device comprising:

delay means having an input connected to the output of said receiver and a number of outputs for delivering a plurality of output signals, the number of outputs being equal to the whole number closest to the ratio of the pass band, B/$b$, and non linear circuit means connected between the outputs of said delay means and said exploiting means, for transmitting, amongst the output signals from said number of outputs, the signal having the greatest amplitude and blocking the other signals.

2. A device as claimed in claim 1, wherein said non-linear circuit means comprises a plurality of diodes, one diode being connected respectively between each output of said delay means and the input of said exploiting means.

3. A device as claimed in claim 1, wherein individual amplifying means are arranged between each output of said delay means and said non-linear circuit means.

* * * * *